F. W. COREY.
KNITTING MACHINE LATCH NEEDLE.
APPLICATION FILED NOV. 15, 1921.

1,433,123.

Patented Oct. 24, 1922.

INVENTOR:
Fred W. Corey
by Macleod, Calver, Copeland P Dike
Attys.

Patented Oct. 24, 1922.

1,433,123

UNITED STATES PATENT OFFICE.

FRED W. COREY, OF TILTON, NEW HAMPSHIRE.

KNITTING-MACHINE LATCH NEEDLE.

Application filed November 15, 1921. Serial No. 515,404.

*To all whom it may concern:*

Be it known that I, FRED W. COREY, a citizen of the United States, residing at Tilton, county of Belknap, State of New Hampshire, have invented a certain new and useful Improvement in Knitting-Machine Latch Needles, of which the following is a specification, reference being had therein to the accompanying drawings.

The invention relates to a new and useful improvement in knitting machine latch needles. The invention relates especially to a new method of riveting the latch in the needle.

One of the worst features of a latch needle as ordinarily constructed is the tendency of the rivets to work loose and to project through the wall and catch the thread. Attempts have been made to form a bearing for the latch by punching in one or both sides of the needle to form a bearing, but in such construction, as heretofore known, the walls can be pried apart so as to disengage the bearings from the latch, and in such cases there is nothing to keep the walls together so that, in fine needles especially, the latches will fly out. The object of the present invention is to make use of punched-in walls to serve as the bearing for the latch and to combine with this a pin to hold the walls together and prevent spreading, but yet to relieve the pin from the strain of serving as a bearing for the latch and thus eliminate any possibility of the action of the latch on the pin to loosen the same.

The invention will be fully understood from the following description when taken in connection with the accompanying drawings, and the novel features thereof will be pointed out and clearly defined in the claims at the close of this specification.

In the drawings, Fig. 1 is a view of a knitting needle embodying the invention.

Fig. 2 is a section through the needle on line *a—a* of Fig. 1, before the pin hole is drilled but after the sides are punched in.

Figure 1:
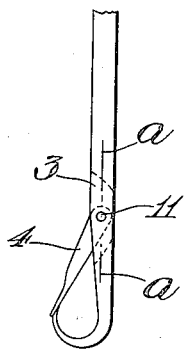
Figure 2:
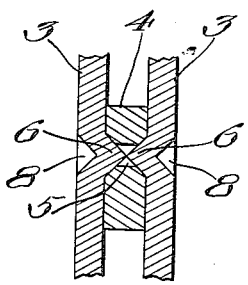

Referring now to the drawings, 3—3 are the two walls or cheeks of the slotted part of the needle between which the latch 4 is pivoted. The latch is formed with a hole 5 drilled therethrough to receive the bearings or pivots for the latch. The bearings are formed by punching in the walls 3—3 of the needle, thus forming the punched-in bearings 6—6 which engage with the hole 5 in the latch. These punched-in portions may be produced by means of punches which may be applied by any suitable machine or tools to punch in the depressions 8—8, thereby making the corresponding conical projections 6—6 on the inner face of the cheeks 3—3 to constitute the bearings.

Figure 3:
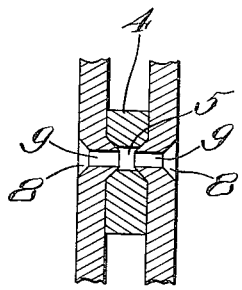
Fig. 3 is a similar view to Fig. 2 after the pin hole is drilled.
Figure 4:
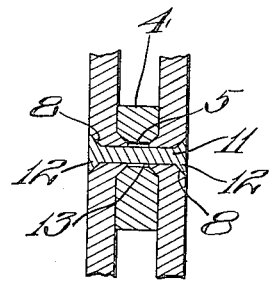
Fig. 4 is a section on line *a—a* of Fig. 1 showing the finished construction in which a pin is inserted through the hole in the walls and latch, the ends of the pin being headed down.

After the bearings have been punched in, a hole 9 is drilled through the conical bearing members 6—6, as shown in Figure 3, leaving the flaring sided recesses 8—8 in the opposite cheek pieces. A pin 11 is then inserted into the said hole passing through the two side cheek pieces and the intermediate latch 4. The ends 12—12 of the pin are then headed down into the conical recesses 8—8 in the cheek pieces so that the pin will hold the two cheek pieces of the needle from spreading apart, the ends of the heads of the pin being smoothed down so that there will be no projecting portion beyond the outside face of the cheek pieces.

The hole 5 is of greater diameter than the pin 11 so that there is a slight space 13 between the pin and the latch. Thus it will be seen that the entire bearing of the latch is on the punched-in portions 6—6 and the latch does not bear upon the pin at all. The pin merely serves to prevent the cheeks of the needle from being spread apart and thereby eliminates any possibility of the action of the latch to loosen the pin.

What I claim is:—

1. A knitting machine latch needle having a slot for the latch, the latch having a pivot hole therethrough, conical bearings consisting of punched-in portions of the walls of the slot in the needle, pin holes through said punched-in bearings, said pin holes being of less diameter than the diameter of the pivot hole in the latch, and a pin passing through said pin hole and having its ends headed down into recesses in the outer walls of the needle.

2. A knitting machine latch needle having a slot for the latch, the latch having a pivot hole therethrough, bearings consisting of conical projections on the inner faces of the two walls of the slot in the needle which engage with said pivot hole in the latch and form the entire bearing for the latch, the pivot hole in the latch being formed with conical portions to correspond with said conical bearings, and a pin which passes through said bearings and through the hole in the latch, the ends of the pin being riveted down, whereby the pin prevents the wall of the slot from spreading apart.

3. A knitting machine latch needle having bearings for the latch formed of inwardly projecting conical portions of the walls of the slot in the needle, a pin passing through said bearings and through the pivot hole of the interposed latch, the diameter of the pin where it passes through the latch being of less diameter than the pivot hole in the latch, so that the said projections from the walls of the needle form the entire bearing for the latch, the pivot hole in the latch being formed with conical portions to correspond with the said conical bearings, said pin having its ends headed to prevent spreading of the walls of the slot in the needle.

4. A knitting machine latch needle having a slot for the latch, the latch having a pivot hole therethrough which flares outwardly toward each end, bearings consisting of inwardly projecting tapered portions of the walls of the slot in the needle which are tapered to fit in the flaring mouthed pivot hole and form the sole bearing portion for the latch, the outer face of the walls of the slot being formed with a conical depression, a pin hole through said bearings, and a pin passing through said pin hole and having its ends headed down into the conical recesses in the outer walls of the slot in the needle.

In testimony whereof I affix my signature.

FRED W. COREY.